Oct. 11, 1932.  G. L. HAMMON  1,882,420
MIXER FOR WELDING TORCHES
Filed July 2, 1929
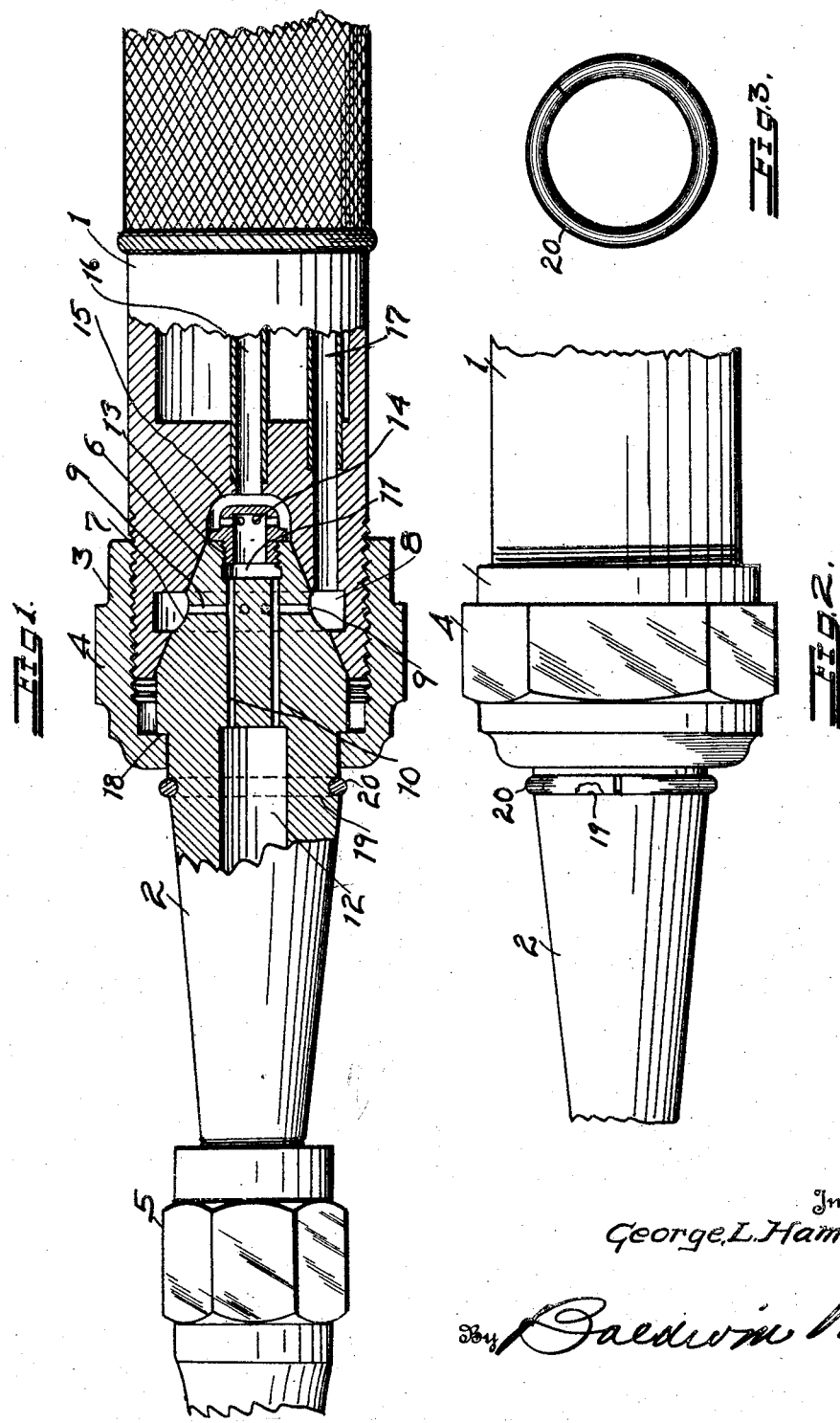

Patented Oct. 11, 1932

1,882,420

UNITED STATES PATENT OFFICE

GEORGE L. HAMMON, OF SAN FRANCISCO, CALIFORNIA

MIXER FOR WELDING TORCHES

Application filed July 2, 1929. Serial No. 375,523.

This invention relates to improvements in mixers for welding torches, and relates more particularly to the means of coupling the mixer to the handle member.

The principle of the mixer shown in this application is the same as that shown in my application filed April 6, 1929, Serial No. 353,045, which has resulted in Patent No. 1,818,949, issued August 11, 1931, but the means of coupling the mixer to the handle is an improvement thereon.

The object of the present invention is to provide a more efficient coupling to prevent leaking gas due to the use of the threaded coupling shown in the above mentioned application.

Another object is to provide means to use a taper coupling and means to hold the taper surfaces tightly together.

Another object is to provide means to protect the taper surface when uncoupled from accidental damages.

Other objects of the invention will be apparent as the description proceeds.

An embodiment of the invention is shown in the accompanying drawing in which the same reference numeral is applied to the same portion throughout the several figures of the drawing.

Figure 1 is a view partly in section of the mixer connected to the handle member, Figure 2 is an elevation of a portion of the mixer and handle coupled, and Figure 3 is a view of the ring to prevent the threaded member from slipping back.

The numeral 1 indicates the handle portion of the torch, 2 is the mixer, 3 is the coupling member which has the hexagon form 4, 5 is the union for coupling the elbow pipe of the burner to the mixer.

The end of the mixer 2 has the taper portion 6 fitting the surface in the handle portion. 7 indicates an annular groove in the taper portion, and 8 an annular recess in the handle member in alignment with the groove. Spaced around in the groove is a plurality of small radial holes 9 which intersect a plurality of longitudinal holes 10 which join the recess 11 with the mixing chamber 12. This chamber communicates with a suitable burner tip not shown. In the end of the taper portion is the hollow threaded plug 13, which has a plurality of small holes communicating with the annular chamber 15 which communicates with the oxygen supply pipe 16. The acetylene supply pipe is shown at 17 and communicates with the recess 8.

A shoulder 18 is provided on the mixer to force it to properly seat when the hexagon 4 is tightened. Spaced a short distance from the back of the threaded member 4 is a groove 19 into which is sprung the ring 20 of spring material.

In the operation of coupling this mixer to the handle, the taper end is placed in the taper receptacle in the handle and the threaded coupling 4 is turned up by hand as tight as possible, and then a wrench is used to make a gas tight joint on the taper surfaces.

The ring 20 is pushed up over the taper portion of the mixer 2 until it snaps into the groove 19 in the mixer. This ring prevents the coupling member 4 from sliding back except for a very short distance, thus acting as a protector for the taper end of the mixer 6 when disconnected.

The ring can be taken off by inserting a screw driver between the edges and turning it to spring the ring out of the groove.

Having thus described my invention, what I desire to secure by Letters Patent of the United States is as follows, but modifications may be made in carrying out the invention as shown in the drawing and in the above particularly described form thereof, within the purview of the annexed claims.

1. A mixer for welding torches comprising a handle having a central tapered opening therein, a mixer body having a mixing chamber therein and having a tapered end adapted to fit into the opening in said handle, said mixer body having a recess in its tapered end communicating with the mixing chamber, a cap having a plurality of perforations in its circumference and fixed in the recess in the end of said mixed body, means to deliver gas to said perforated cap, means to deliver another gas to the mixing chamber, and means to seat the tapered end of said mixer body in the opening in said handle.

2. A mixer for welding torches comprising a handle having a central tapered opening therein, a mixer body having a mixing chamber therein and having a tapered end adapted to fit into the opening in said handle, the end of said mixer body having a recess therein and having a plurality of interspaced passages joining said recess with the mixing chamber, the end of said mixer body also having a plurality of radially disposed open passages communicating with said interspaced passages, a cap having a plurality of interspaced perforations in its circumference and adapted to close the recess in the end of said mixer body, means to deliver gas to said perforated cap, means to deliver gas to the radially disposed open passages in the end of said mixer body, and means to seat the tapered end of said mixer body in the opening in said handle.

In testimony whereof I have hereunto set my hand this 4th day of June A. D. 1929.

GEORGE L. HAMMON.